United States Patent [19]

Eto et al.

[11] Patent Number: 4,580,085
[45] Date of Patent: Apr. 1, 1986

[54] FEED CONTROL SYSTEM WITH A SAFETY DEVICE

[75] Inventors: Kunihiko Eto, Toyota; Syuichi Nakada, Kariya; Kaoru Owa; Tadashi Koyama, both of Okazaki, all of Japan

[73] Assignee: Toyoda Koki Kabushiki Kaisha, Kariya, Japan

[21] Appl. No.: 724,165

[22] Filed: Apr. 17, 1985

[30] Foreign Application Priority Data

Apr. 27, 1984 [JP] Japan .................................. 59-87220

[51] Int. Cl.$^4$ ............................................ G05B 23/02
[52] U.S. Cl. .................................. 318/565; 318/563; 318/571; 364/184; 364/474
[58] Field of Search ....................... 318/563, 565, 571; 364/184, 474

[56] References Cited

U.S. PATENT DOCUMENTS

| | | | |
|---|---|---|---|
| 3,483,455 | 12/1969 | Klysa, Jr. ............................ | 318/563 |
| 3,634,746 | 1/1972 | Strege, Sr. ........................... | 381/565 |
| 3,802,622 | 4/1974 | Nishimura et al. .................. | 318/563 |
| 4,130,787 | 12/1978 | Allaire et al. ........................ | 318/565 |
| 4,366,423 | 12/1982 | Inaba et al. .......................... | 318/565 |
| 4,412,162 | 10/1983 | Kitamura ............................. | 318/563 |
| 4,484,287 | 11/1984 | Gamo et al. ......................... | 364/184 |

Primary Examiner—B. Dobeck
Attorney, Agent, or Firm—Oblon, Fisher, Spivak, McClelland & Maier

[57] ABSTRACT

In a feed control system, a feed controller controls a servomotor in such a manner as to reduce the difference between an objective position and a present position of a movable body. An interference detection circuit coupled to the feed controller detects the occurrence of an interference between the movable body and an obstruction when feed movement of the movable body is discontinued nevertheless the difference between the objection and present positions does not reach zero. A digital computer is coupled to an objective position counter provided in the feed controller to selectively set therein objective positions to which the movable body is to be positioned successively. The digital computer, when receiving a signal from the interference detection circuit, sets the objective position counter with data for moving the movable body a predetermined amount in a direction opposite to that wherein the movable body was moved before the occurrence of an interference.

5 Claims, 7 Drawing Figures

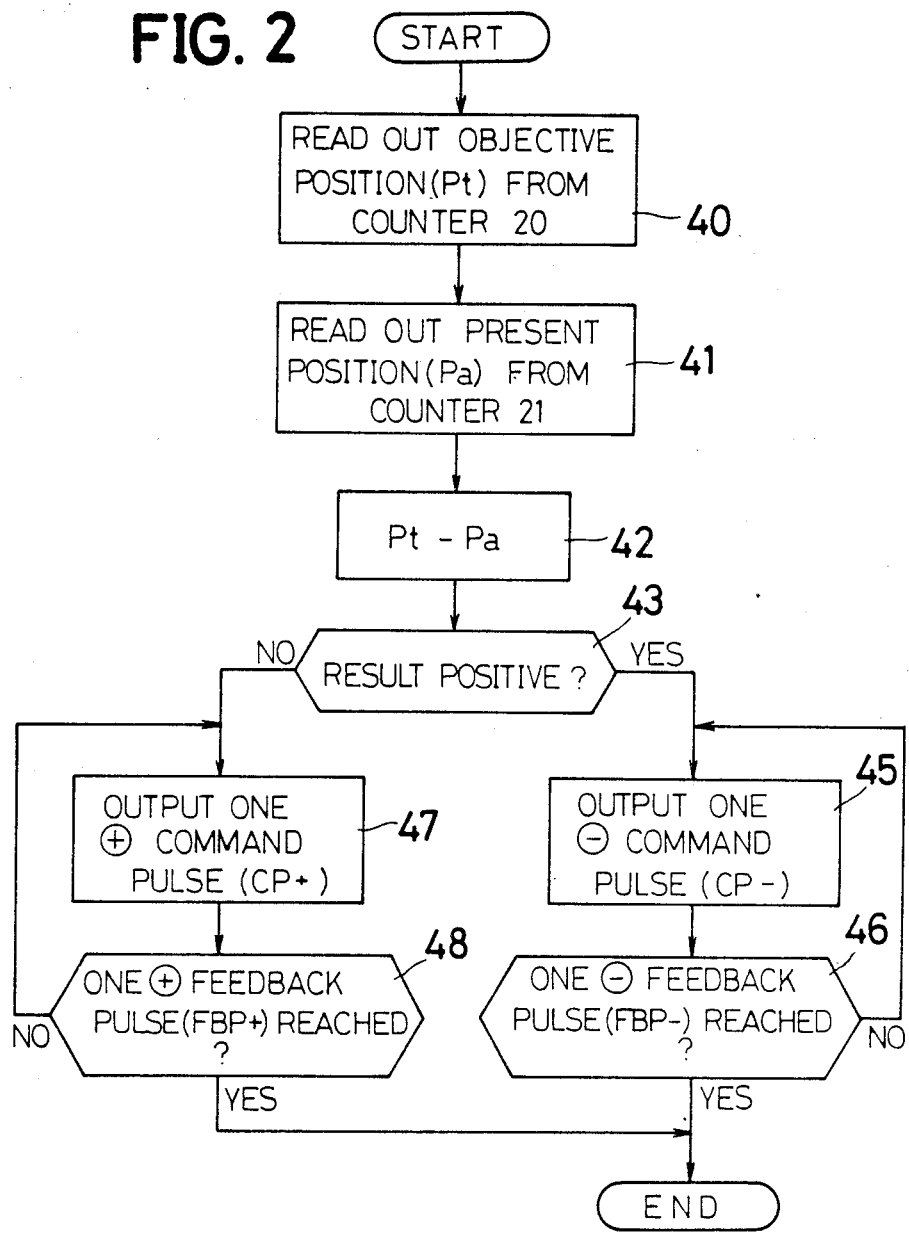

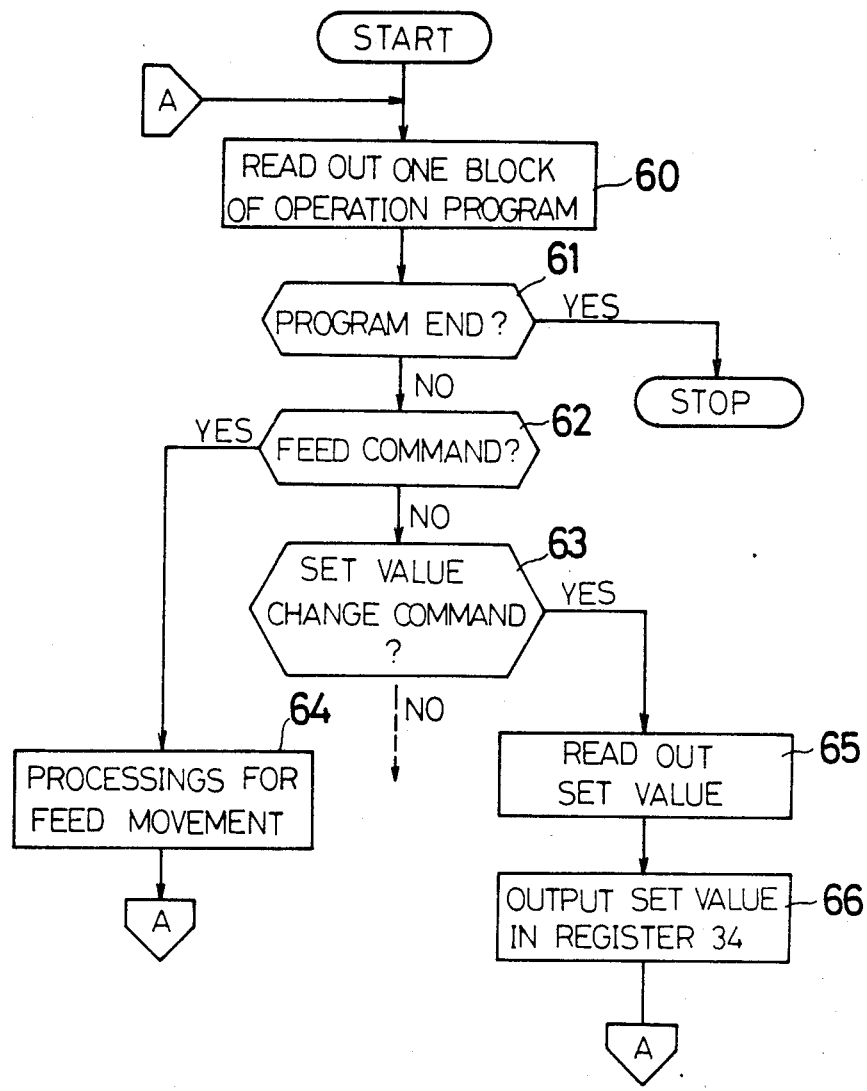

FEED CONTROL SYSTEM WITH A SAFETY DEVICE

BACKGROUND OF THE INVENTION

1. Field of the Invention

The present invention relates to a feed control system of the type wherein the rotation of a servomotor is controlled to move a movable body to an objective position designated by command data.

2. Description of the Prior Art

In a known feed control system for an industrial robot, an integrator is provided in a drive circuit which drives a servomotor for moving a working head. When the difference between an objective position and a present position of the working head is small, but the small difference is continued, the integrator operates to gradually increases an electric power supplied to the servomotor. Thus, the servomotor is rotated with a large torque so that the positioning accuracy of the working head can be heightened.

However, even when the working head interferes with an obstruction just before reaching an objective position, the electric power supplied to the servomotor is gradually increased by the operation of the integrator after the occurrence of the interference. The servomotor is thus caused to generate a large torque, and en excess force is exerted upon the working head, thereby resulting in destroying the working head.

SUMMARY OF THE INVENTION

Accordingly, it is a primary object of the present invention to provide an improved feed control system capable of eliminating the interference of a movable body with any obstruction immediately upon the occurrence of the interference.

Another object of the present invention is to provide an improved feed control system of the character set forth above which is capable of detecting the occurrence of an interference of a movable body with any obstruction based upon an amount through which the movable body is moved for an objective position.

Briefly, in a feed control system according to the present invention, in order to move a movable body to an objective position, a servomotor is controlled in such a manner as to reduce the difference between the objective position set in an objective position setting device and a present position detected by a position detector. When the stopping of the movable body is detected based upon the output of the position detector nevertheless the difference does not reach zero, an interference detector detects the occurrence of an interference of the movable body with an obstruction and outputs an interference detection signal. In response to this signal, a return commander generates feed commands instructing that the movable body be moved a predetermined amount in a direction opposite to that in which the movable body was fed before the detection of the interference. The feed commands are used to change the content of the objective position setting device, whereby the movable body is moved the predetermined amount away from the obstruction.

With this configuration, the occurrence of an interference is automatically detected and the movable body is retracted from the obstruction. This prevents the movable body from being stopped with a large load being exerted thereon, and thus, the damage or deformation of the movable body can be effectively avoided.

Moreover, since the occurrence of the interference is detected based upon an amount through which the movable body is moved for an objective position, reliable detection is possible for any interferences which occur in all directions.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which:

FIG. 2 is a flow chart of processings executed by a central processing unit shown in FIG. 1;

Figure 4A:
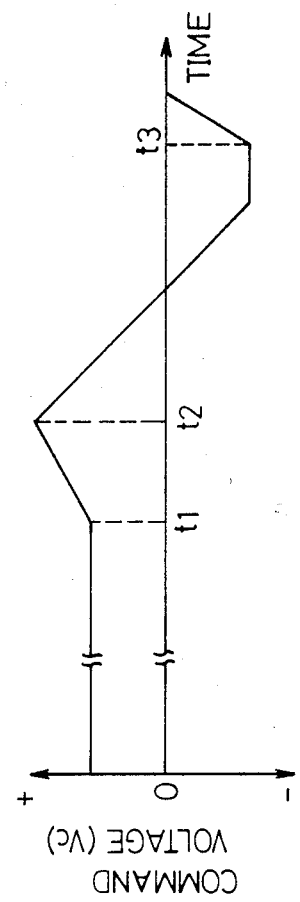
Figure 4B:
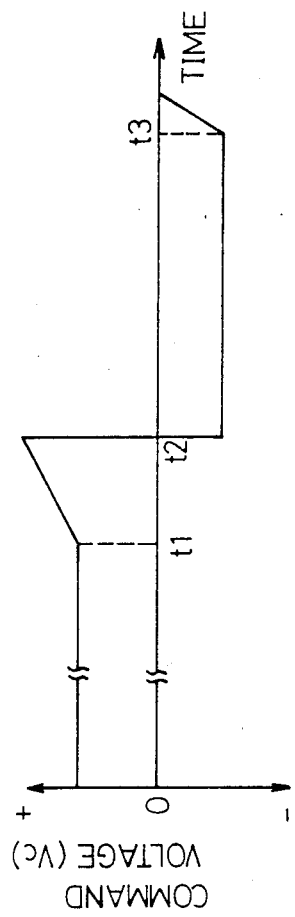
Figure 5:
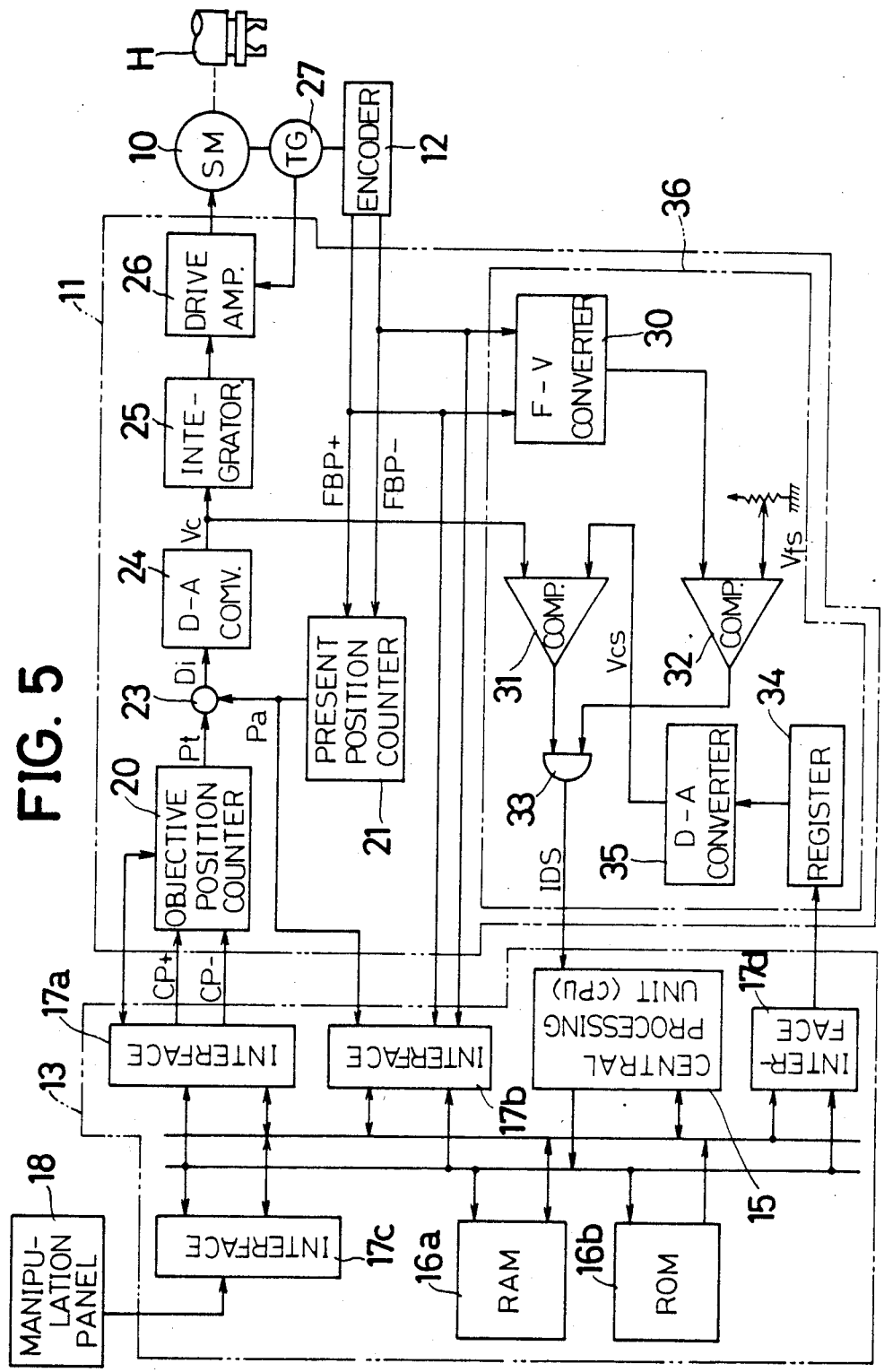

FIGS. 4(a) and 4(b) are graphs representing command voltages Vc in the first and second embodiments, respectively;

FIG. 5 is a block diagram showing another robot controller according to a third embodiment of the present invention; and FIG. 6 is a flow chart of processings executed by a central processing unit shown in FIG. 5.

DETAILED DESCRIPTION OF THE PREFERRED EMBODIMENTS

Figure 1:
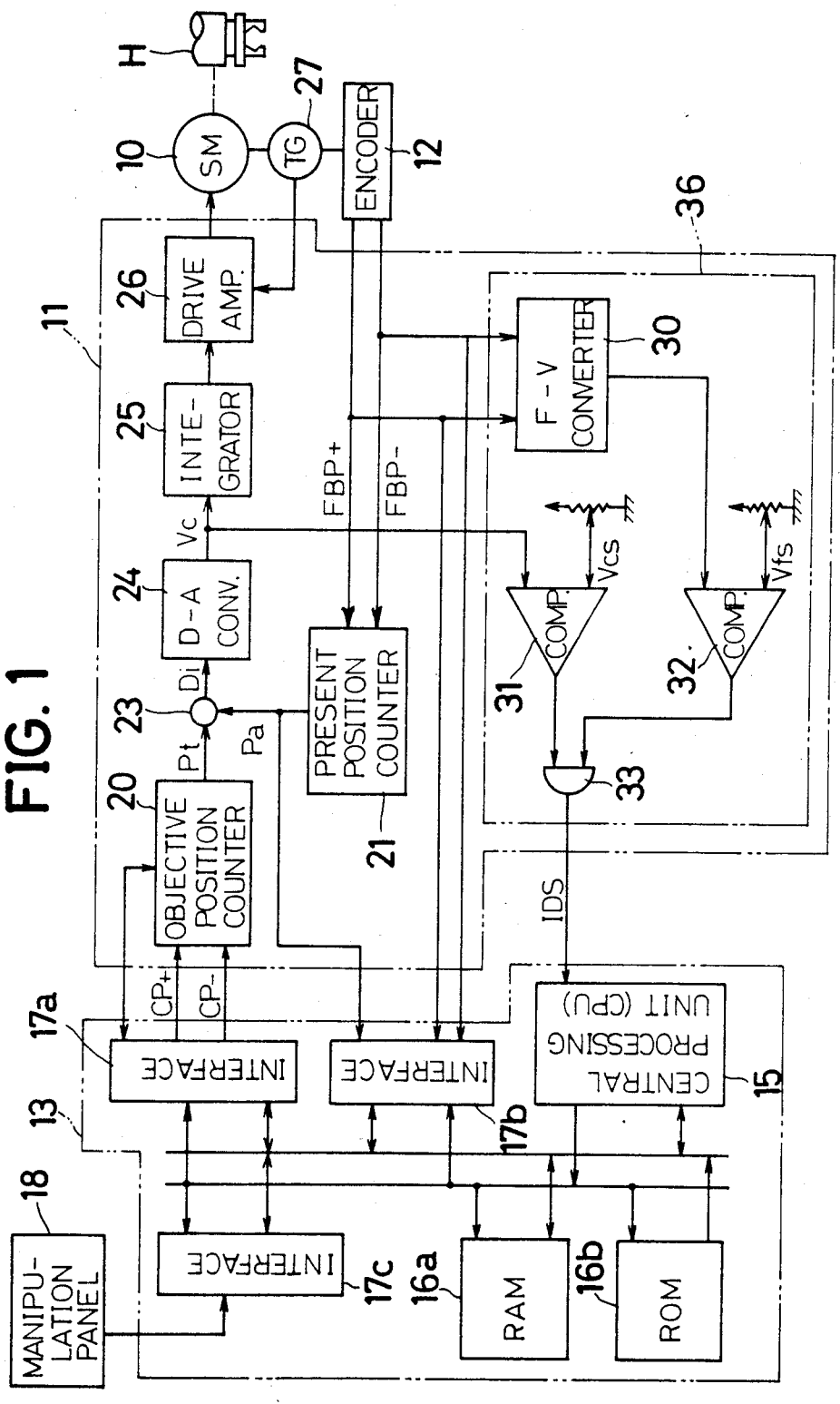
FIG. 1 is a block diagram showing a robot controller according to a first embodiment of the present invention.

Referring now to the drawings and particularly to FIG. 1 thereof, there is illustrated a system to which the present invention is applied for controlling an industrial robot. A numeral 10 denotes a servomotor in a given control axis for moving a movable body or working head H through a suitable feed mechanism, not shown, and a numeral 11 denotes a servomotor drive circuit for driving the servomotor 10. Further, a numeral 13 denotes a computer for successively outputting objective position data Pt to the servomotor drive circuit 11 so as to drive the servomotor 10. The computer 13 is composed of a central processing unit 15 (hereafter referred to as "CPU"), a read-only memory (hereafter referred to as "ROM") 16b for storing a system program, and a random access memory (hereafter referred to as "RAM") 16a. The computer 13 is connected through an interface 17c to a manipulation panel 18, which is used for inputting an operation program and for teaching positions.

The servomotor drive circuit 11 includes an objective position counter 20 to which objective positions Pt are selectively set by the computer 13, and a present position counter 21 which detects the present position Pa of the working head H in the given control axis by reversibly counting positive and negative-going feedback pulses FBP+ and FBP− output from an encoder 12 connected to the servomotor 10. The difference Di between count values Pt, Pa of the objective and present position counters 20, 21 is digitally calculated by an arithmetic circuit 23. The difference Di calculated by the arithmetic circuit 23 is converted by a digital-analogue converter 24 to an analogue command voltage Vc, which is applied through an integrator 25 to a drive amplifier 26 including a pulse width modulator, not shown. A reference numeral 27 denotes a tachometer generator for feed rate feedback control.

The count values Pt, Pa of the objective position counter 20 and the present position counter 21 are respectively supplied to interfaces 17a and 17b of the computer 13, and this enables the CPU 15 to read the objective position Pt and the present position Pa indicated respectively by the objective position counter 20 and the present position counter 21. The objective position counter 20 is operable to add "1" to, or subtract "1" from, its content in response to each command pulse CP+ or CP− output from the interface 17a. Further, the encoder 12 is connected to the interface 17b of the computer 13 to supply thereto each feedback pulse FBP+ or FBP−.

Constructed by an F-V (Frequency to Voltage) converter 30, comparators 31 and 32 and an AND gate 33 is an interference detection circuit 36 for detecting the interference of the working head H with any obstruction when the working head H is stopped before reaching a given objective position. The F-V converter 30 outputs a signal corresponding to the frequency of the feedback pulses FBP+ and FBP− output from the encoder 12. When feedback pulses FBP+ or FBP− are output from the encoder 12 at a frequency corresponding to a feed rate, the output value of the F-V converter 30 exceeds a set value Vfs which is approximate to 0 (zero) volt so as to cause the comparator 32 not to output a signal. However, when the output of the feedback pulses FBP+ or FBP− is discontinued upon the stopping of movement of the working head H, the output from the F-V converter 30 becomes zero to cause the comparator 32 to output a signal.

On the other hand, the comparator 31 compares the output of the D-A converter 24 with a set voltage Vcs which is chosen to a value approximate to zero volt. The comparator 31 outputs a signal while the command voltage Vc is larger than the set voltage Vcs, namely while the working head H is moving toward an objective position Pt, but discontinues the outputting of such a signal when the working heads H reaches the objective position. The output of the comparator 31 along with the output of the comparator 32 are input to the AND gate 33 for outputting an interference detection signal IDS.

Consequently, in the event that the working head H is stopped before reaching an objective position Pt, the interference detection signal IDS is output as an interruption to the CPU 15 of the computer 13.

With reference to a flow chart shown in FIG. 2, the operation of the system as constructed above will now be described on the assumption that the interference detection signal IDS has just been output from the AND gate 33 to apply an interruption to the CPU 15.

The CPU 15, when receiving the interruption signal, first reads an objective position Pt and a present position Pa stored respectively in the objective position counter 20 and the present position counter 21 (steps 40 and 41), and then, carries out a calculation of (Pt−Pa) (step 42). The CPU 15 ascertains whether the result of such a calculation indicates a positive value or a negative value, so as to determine the moving direction of the working head H before the occurrence of an interference (step 43).

When the moving direction is determined to be a positive-going direction, the CPU 15 outputs negative-going command pulses CP− from the interface 17a to the objective position counter 20 until one negative-going feedback pulse is output from the encoder 12 (steps 45 and 46). This results in changing the objective position Pt of the objective position counter 20 toward a negative value. Consequently, as shown in FIG. 4 (a), the command voltage Vc supplid to the integrator 25 is gradually decreased since the interference is detected at time point (t2) after the expiration of a predetermined time period from time point (t1) when the inteference occurred, and at last, the integrator 25 is supplied with a negative command voltage −Vc whose polarity is opposite to that which was supplied to the integrator 25 before the occurrence of the interference. As a result, the rotational direction of the servomotor 10 is reversed to return the working head H toward a start position which is in a negative-going direction with respect to the interfering position. When the working head H is moved one pulse in the negative-going direction and one negative-going feedback pulse FBP− is output from the encoder 12, the movement of the working head W is discontinued. Therefore, an external force exerted on the working head H due to the interference is eliminated, whereby the working head H can be prevented from being damaged.

On the other hand, when the moving direction of the working head H is determined to be a negative-going direction, positive-going command pulses CP+ are supplied to the objective position counter 20 until one positive-going feedback pulse FBP+ is output from the encoder 12, so as to change the objective position Pt in the objective position counter 20 toward a positive value (steps 47 and 48). This causes the servomotor 10 to rotate in a direction opposite to that before the occurrence of the interference, and when the working head H is moved in the positive-going direction and one positive-going feedback pulse FBP+ is output, the movement of the working head H is discontinued.

As described above, in the present embodiment, since the working head H is stopped at a position which is returned one pulse from the interfering position, the working head H is positioned close to the interfering position. This advantageously makes it possible to determine the location at which the interference has occurred.

Figure 3:
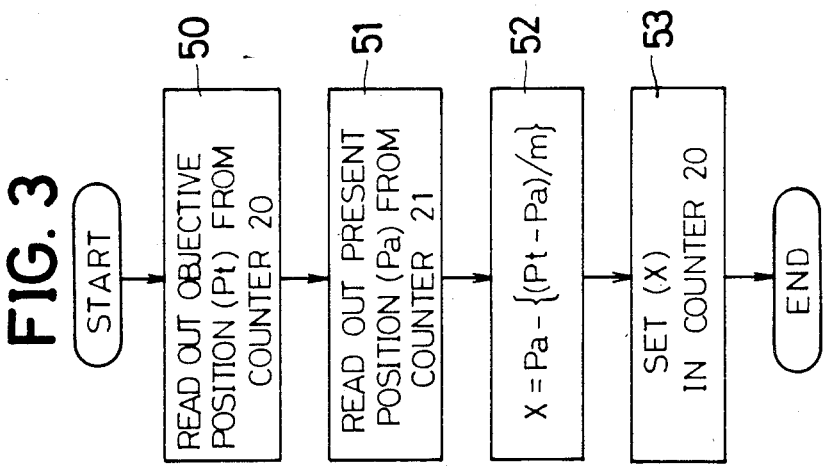
FIG. 3 is a flow chart of processings executed by the central processing unit in a second embodiment of the present invention.

FIG. 3 shows a flow chart of a modified program which the CPU 15 executes in place of that shown in FIG. 2. The CPU 15 reads out an objective position Pt and a present position Pa stored in the objective position counter 20 and the present position counter 21 (steps 50 and 51) and then, calculates a coordinate value X indicative of a return position based upon the following equation (1).

$$X = Pa - \{(Pt - Pa)/m\} \tag{1}$$

In the equation (1), a symbol "m" indicates a positive natural number.

Subsequently, the calculated coordinate value X is preset as an objective position Pt in the objective position counter 20.

Consequently, the content of the objective position counter 20 is changed to indicate a position which is closer by a distance (Pt−Pa)/m to a start position than the present position Pa at the time of the detection of an interference. Thus, the polarity of the command voltage Vc supplied to the integrator 25 is abruptly inverted at time point t2 from the state before the occurrence of the interference, as shown in FIG. 4(b). Since the rotational direction of the servomotor 10 is reversed, the working head H is returned by the distance (Pt−Pa)/m toward the start position.

In the case where a press fitting tool for press-fitting works or a nut runner for nut drive works is used as the working head H, it is often that the working head H is stopped at a position immediately before an objective position. Thus, in such works, the value of the set voltage Vcs must be increased to avoid that incomplete movement of the working head H to an objective position is detected as the occurrence of an interference. FIGS. 5 and 6 shows a third embodiment which is designed for such works. In this embodiment, the computer 13 is provided with another interface 17d, and the interference detection circuit 36 is provided with a register 34 connected to the interface 17d and a D-A (digital to analogue) converter 35. This D-A converter 35 converts a set value of the register 34 into an analogue set voltage Vcs to supply it to the comparator 31.

Further, a program shown in FIG. 6 is stored in the ROM 16b of the computer 13, and processings for steps 65 and 66 are executed when a set value change command included in the operation program is read out in step 63. Thus, a new set value which is programmed together with the set value change command is read out to be set in the register 34. Accordingly, in this particular embodiment, it is possible to change the set voltage Vcs depending upon the kind of a work to be performed by the working head H. Particularly, in the case of a press-fitting work or a nut drive work, the wrong detection of an interference of the working head H is prevented by chosing the set voltage Vcs to a large value, although it is possible to detect an interference occurring at a position which is spaced more than a distance corresponding to the set voltage Vcs from an objective position Pt.

Obviously, numerous modifications and variations of the present invention are possible in light of the above teachings. It is therefore to be understood that within the scope of the appended claims, the present invention may be practiced otherwise than as specifically described herein.

What is claimed is:

1. A feed control system for a movable body, comprising:
    a servomotor rotatable for feeding said movable body;
    objective position setting means for setting an objective position to which said movable body is to be positioned;
    position detection means for detecting the present position of said movable body;
    feed control means connected to said objective position setting means, said position detection means and said servomotor for controlling said servomotor in such a manner that the difference between said objective position set in said objective position setting means and said present position detected by said position detection means is reduce to zero, so as to move said movable body to said objective position;
    interference detection means for detecting the interference of said movable body with an obstruction when the movement of said movable body is discontinued before said difference between said objective position and said present position is reduced to zero; and
    return command means responsive to an interference detection signal output from said interference detection means upon the detection of said interference for supplying said objective position setting means with feed command data instructing said movable body to be moved a predetermined amount in a direction opposite to a moving direction of said movable body before said interference is detected.

2. A feed control system as set forth in claim 1, wherein said return command means comprises:
    objective position changing means for changing the content of said objective position setting means so as to move said movable body in a direction opposite to that in which said movable body is moved before the occurrence of said interference; and
    control means for causing said objective position changing means to operate until the change in the moving direction of said movable body is detected after the occurrence of said interference.

3. A feed control system as set forth in claim 1, wherein said return command means comprises:
    return position calculation means for calculating a return position which is located in a direction opposite to that wherein said movable body is moved before the occurrence of said interference and at which said movable member does not interfere with said obstruction; and
    return position setting means responsive to the detection of said interference by said interference detection means for setting said calculated return position in said objective position setting means.

4. A feed control system as set forth in claim 1, wherein said interference detection means comprises:
    first detection means coupled to said position detection means for outputting a first signal when said movable body is stopped;
    second detection means coupled to said feed control means for generating a second signal when a difference is between said objective position and said present position;
    a gate circuit responsive to said first and second signals from said first and second detection means for outputting said interference detection signal to said return command means.

5. A feed control system as set forth in claim 1, wherein said interference detection means comprises:
    first detection means coupled to said position detection means for outputting a first signal when said movable body is stopped;
    reference setting means for setting a reference value;
    second detection means coupled to said feed control means and said reference setting means for generating a second signal when the difference between said objective position and said present position exceeds said reference value; and
    a gate circuit responsive to said first and second signals from said first and second detection means for outputting said interference detection signal to said return command means.

* * * * *